United States Patent
Barillaud et al.

(10) Patent No.: US 9,167,103 B2
(45) Date of Patent: *Oct. 20, 2015

(54) SUBSIDIZING WIRELESS SERVICES IN GEO-FENCED ZONES

(71) Applicant: International Business Machines Corporation, Armonk, NY (US)

(72) Inventors: Franck Barillaud, Austin, TX (US); Insoo Cho, Pittsburgh, PA (US); Daniel M. Christiani, Rochester, NY (US); Mark Robert Thill, Seattle, WA (US); David Sun Zhang, Norcross, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/099,417

(22) Filed: Dec. 6, 2013

(65) Prior Publication Data

US 2015/0148002 A1    May 28, 2015

Related U.S. Application Data

(63) Continuation of application No. 14/090,965, filed on Nov. 26, 2013.

(51) Int. Cl.
| | |
|---|---|
| *H04M 11/00* | (2006.01) |
| *H04M 15/00* | (2006.01) |
| *H04W 4/02* | (2009.01) |
| *H04W 4/24* | (2009.01) |
| *H04W 4/26* | (2009.01) |
| *H04W 12/08* | (2009.01) |

(52) U.S. Cl.
CPC .......... *H04M 15/8033* (2013.01); *H04W 4/021* (2013.01); *H04W 4/24* (2013.01); *H04W 4/26* (2013.01); *H04W 12/08* (2013.01)

(58) Field of Classification Search
CPC ....... H04W 4/24; H04W 8/245; H04W 64/00; H04L 29/08072
USPC .......... 455/406, 418, 456.5; 709/219
See application file for complete search history.

(56) References Cited

U.S. PATENT DOCUMENTS

| | | | |
|---|---|---|---|
| 2004/0069533 A1* | 4/2004 | Puttmann | 175/57 |
| 2004/0203587 A1* | 10/2004 | Bekanich | 455/407 |

(Continued)

FOREIGN PATENT DOCUMENTS

| | | |
|---|---|---|
| EP | 2304462 A1 | 4/2011 |
| EP | 2190243 B1 | 11/2011 |

*Primary Examiner* — Danh Le
(74) *Attorney, Agent, or Firm* — Garg Law Firm, PLLC; Rakesh Garg; Steven L. Bennett

(57) ABSTRACT

A method for subsidizing wireless services in geo-fenced zones is provided in the illustrative embodiments. A geo-fenced zone is configured, the geo-fenced zone comprising a boundary defined by a set of fixed points in space. A subsidized pricing is configured for the wireless service when the wireless service is consumed by a mobile device within the geo-fenced zone, forming a subsidized wireless service. The mobile device is detected in the geo-fenced zone. The mobile device is provided the subsidized wireless service. A billing entry is applied to an account associated with the mobile device, wherein the billing entry charges the account a subsidized amount corresponding to a measured amount of subsidized wireless service used by the mobile device while the mobile device remains within the geo-fenced zone.

12 Claims, 5 Drawing Sheets

(56) References Cited

U.S. PATENT DOCUMENTS

2013/0297564 A1* 11/2013 Brenton et al. .............. 707/634
2013/0337769 A1* 12/2013 Bhatia et al. ................. 455/406
2014/0280758 A1* 9/2014 Sharma et al. ............... 709/219

* cited by examiner

SUBSIDIZING WIRELESS SERVICES IN GEO-FENCED ZONES

The present application is a continuation application of, and claims priority to, a U.S. patent application of the same title, Ser. No. 14/090,965, which was filed on Nov. 26, 2013 assigned to the same assignee, and incorporated herein by reference in its entirety.

TECHNICAL FIELD

The present invention relates generally to a method for providing wireless services to mobile devices. More particularly, the present invention relates to a method for subsidizing wireless services in geo-fenced zones.

BACKGROUND

Mobile devices such as laptop computers, tablet computers, smartphones, digital book readers, and many such devices utilize various modes of wireless communication reaching the internet. Wi-Fi network from a wireless access point, and wireless broadband such as 3G or 4G data service over a wireless service provider's network are the two most commonly used wireless methods for connecting to the internet from a mobile device.

Many places offer free Wi-Fi access to mobile devices when they are within range of a Wi-Fi access point device. For example, certain coffee shops offer free use of their Wi-Fi network to their patrons. Unintentionally, persons who are not patrons, and not even present in the place of business, can also detect the free Wi-Fi network and use the free Wi-Fi services.

Some entities that provide free Wi-Fi access also employ some method of controlling that access. For example, the coffee shop may require a password that can only be obtained on a sales receipt upon purchase of some product. As another example, some public places, such as libraries, limit the use of free Wi-Fi access to preset durations. Some other entities configure their access points to allow only a certain number of devices to connect at any given time.

SUMMARY

The illustrative embodiments provide a method for subsidizing wireless services in geo-fenced zones. An embodiment includes a method for subsidizing a wireless service. The embodiment configures a geo-fenced zone, the geo-fenced zone comprising a boundary defined by a set of fixed points in space. The embodiment configures a subsidized pricing for the wireless service when the wireless service is consumed by a mobile device within the geo-fenced zone, forming a subsidized wireless service. The embodiment detects the mobile device in the geo-fenced zone. The embodiment provides the mobile device the subsidized wireless service. The embodiment applies a billing entry to an account associated with the mobile device, wherein the billing entry charges the account a subsidized amount corresponding to a measured amount of subsidized wireless service used by the mobile device while the mobile device remains within the geo-fenced zone.

Another embodiment includes a computer usable storage device including computer usable code for subsidizing a wireless service. The embodiment further includes computer usable code for configuring a geo-fenced zone, the geo-fenced zone comprising a boundary defined by a set of fixed points in space. The embodiment further includes computer usable code for configuring a subsidized pricing for the wireless service when the wireless service is consumed by a mobile device within the geo-fenced zone, forming a subsidized wireless service. The embodiment further includes computer usable code for detecting the mobile device in the geo-fenced zone. The embodiment further includes computer usable code for providing the mobile device the subsidized wireless service. The embodiment further includes computer usable code for applying a billing entry to an account associated with the mobile device, wherein the billing entry charges the account a subsidized amount corresponding to a measured amount of subsidized wireless service used by the mobile device while the mobile device remains within the geo-fenced zone.

Another embodiment includes a storage device including a storage medium, wherein the storage device stores computer usable program code. The embodiment further includes a processor, wherein the processor executes the computer usable program code. The embodiment further includes computer usable code for configuring a geo-fenced zone, the geo-fenced zone comprising a boundary defined by a set of fixed points in space. The embodiment further includes computer usable code for configuring a subsidized pricing for the wireless service when the wireless service is consumed by a mobile device within the geo-fenced zone, forming a subsidized wireless service. The embodiment further includes computer usable code for detecting the mobile device in the geo-fenced zone. The embodiment further includes computer usable code for providing the mobile device the subsidized wireless service. The embodiment further includes computer usable code for applying a billing entry to an account associated with the mobile device, wherein the billing entry charges the account a subsidized amount corresponding to a measured amount of subsidized wireless service used by the mobile device while the mobile device remains within the geo-fenced zone.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
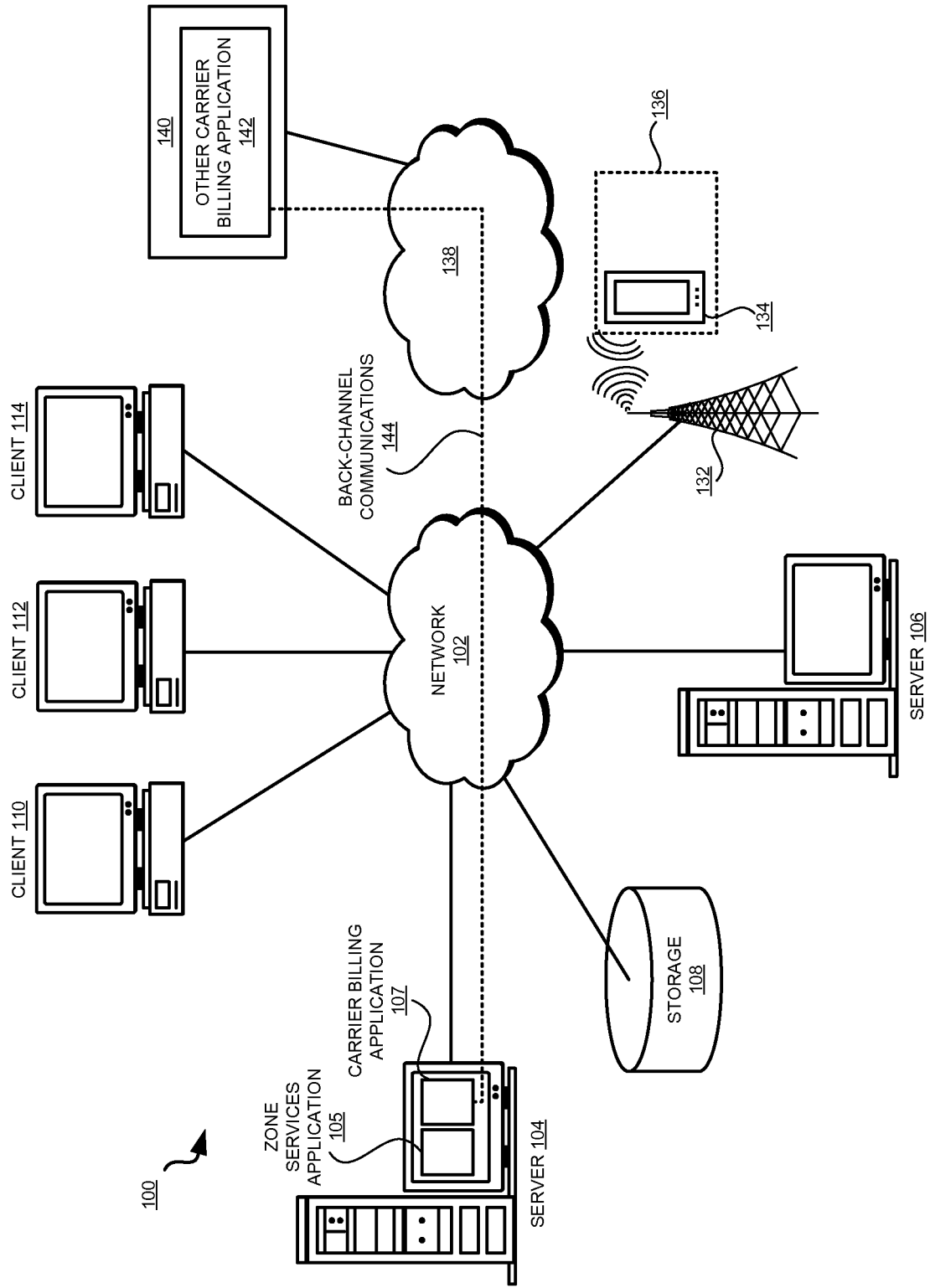
FIG. 1 depicts a block diagram of a network of data processing systems in which illustrative embodiments may be implemented.

The illustrative embodiments recognize that presently available free Wi-Fi access can only be controlled using some method of authentication. As long as a mobile device can detect a Wi-Fi network, to wit, the mobile device is in the useful range of the wireless access point's transceiver, the device can connect to the Wi-Fi network given proper authentication.

Furthermore, the illustrative embodiments recognize that entities that provide free Wi-Fi access do so either to realize some commercial gain from the free service or to provide some public service. The illustrative embodiments recognize that the purpose for which an entity grants free Wi-Fi access is often adversely affected by two factors—one, the inability to control unintended connections by non-patrons without some overhead expense; and two the saturation of the Wi-Fi bandwidth due to such unintended connections.

Therefore, the illustrative embodiments recognize that providing another form of wireless access will be advantageous. A wireless service provider within the scope of the illustrative embodiments is any provider of non Wi-Fi mobile communication services. A wireless service, a wireless access, or a wireless network within the scope of the illustrative embodiments includes any non Wi-Fi wireless network, access, or service. A mobile phone service provider is an example of a wireless service provider that providers wireless services over a wireless broadband data network, which is different from a Wi-Fi network operating according to IEEE 802.11 a/b/g/n specifications or other similar specifications.

The illustrative embodiments further recognize that subsidizing such additional form of wireless access to either be free or be available at some reduced rate or tariff will be advantageous. The illustrative embodiments further recognize that controlling the offering of such subsidized wireless access to a well-defined geographical area or space will also be advantageous. For example, by providing a subsidized wireless service within a well defined boundary of an entity's premises, the entity can offload some network load from Wi-Fi to the subsidized wireless service.

Additionally, the illustrative embodiments recognize that controlling access to the subsidized wireless service such that even if the useful range of a transceiver from which the service is provided extends outside the well-defined geographical area or space, users will not be able to use the subsidized wireless service without their devices (and by extension, them) being physically within the well-defined geographical area or space. In other words, where presently, users can connect to a subsidized Wi-Fi service by remaining outside a subsidizing entity's premises but remaining within the range of the Wi-Fi transceiver, an illustrative embodiment disallows such disadvantageous access. Thus, the entity providing the subsidized wireless service can more precisely control the access to the subsidized wireless service to only those devices that are within the well-defined boundary and therefore beneficial to the entity's business purpose in providing the subsidy.

Furthermore, the illustrative embodiments recognize that the wireless service is provided by a commercial wireless service provider using a large infrastructure of towers, base stations, and high bandwidth tower and backbone connections. Therefore, because the subsidized wireless service is provided from an infrastructure of much larger capacity than a Wi-Fi access point, the entity benefits from a much larger number of patrons connecting their devices using the subsidized wireless service from within the controlled area.

The illustrative embodiments used to describe the invention generally address and solve the above-described problems and other problems related to subsidized network access. The illustrative embodiments provide a method for subsidizing wireless services in geo-fenced zones.

An embodiment defines a geo-fence within which an entity wishes to offer subsidized wireless service. A geo-fence is a two dimensional area or a three dimensional space (geo-fenced zone) clearly demarcated and identifiable using a suitable manner of marking a location. For example the geofence according to an embodiment can be demarcated using global positioning system (GPS), radio frequency identification (RFID), or triangulation.

The embodiment informs a wireless service provider of the boundaries of the geo-fenced zone and of the terms of subsidizing wireless access over the provider's network from within the zone. The wireless service provider provisions services for patrons to use on a subsidized basis when present within the geo-fenced zone.

One embodiment allows devices that subscribe to the provider's services to use the subsidized services from within the geo-fenced zone. Another embodiment allows other devices, including those devices that do not subscribe to the provider's services, to also utilize the subsidized services while within the geo-fenced zone.

The illustrative embodiments are described with respect to, certain methods for describing a geo-fenced zone, manners of subsidizing wireless services, devices, types of wireless services, messages, communications, data processing systems, environments, components, and applications only as examples. Any specific manifestations of such artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
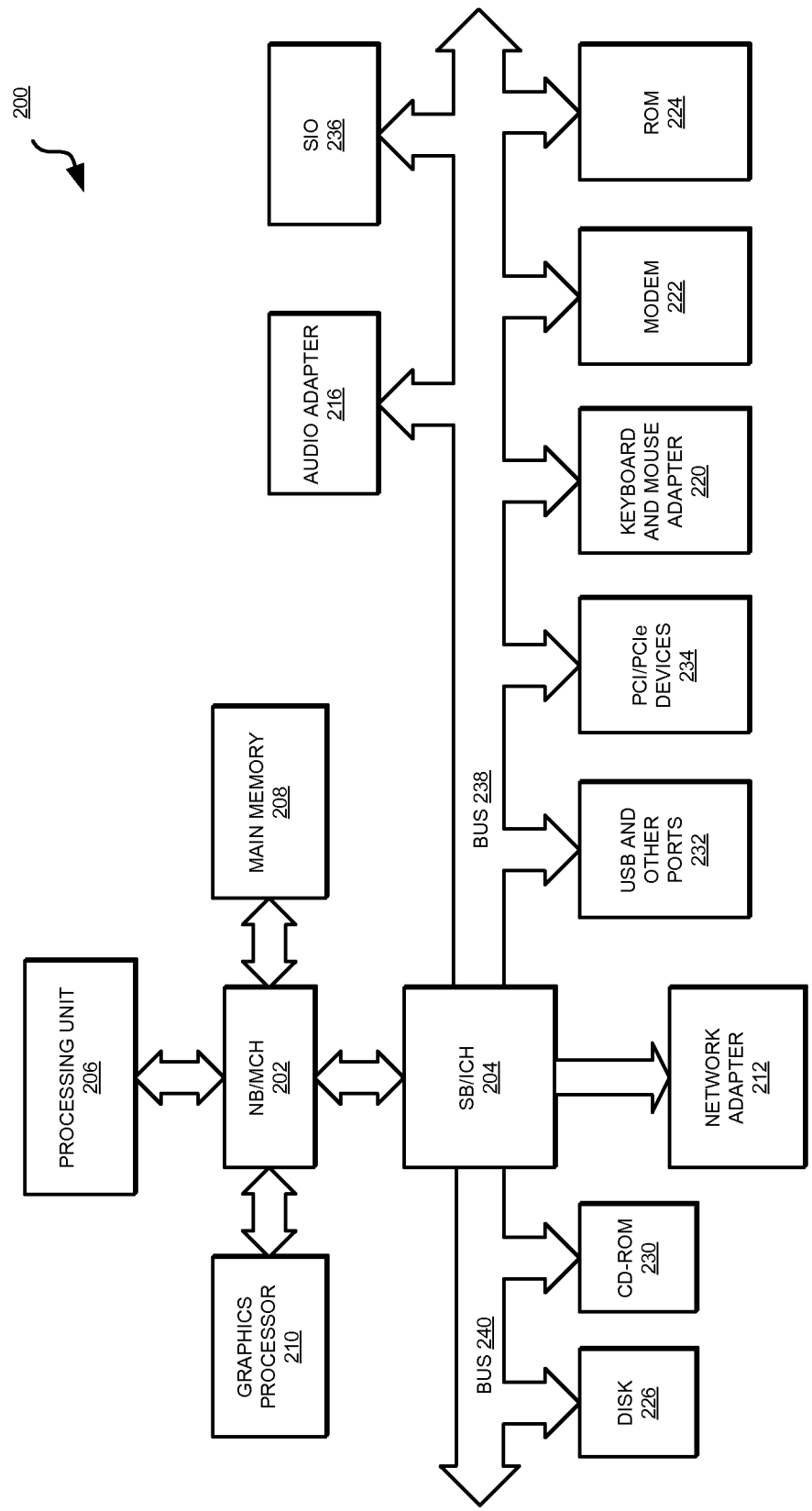
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are useable in an embodiment. Zone services application 105 implements an embodiment described herein. Carrier billing application 107 is an application usable by a wireless service provider (carrier) for billing a mobile device, e.g., device 134, for the wireless services consumed by the device. Tower 132 comprises communication infrastructure usable for delivering wireless services to mobile device 134. Zone 136 represents a geo-fenced zone according to an embodiment. Network 138 is similar to network 102, and either is a part of network 102, or is in communication with network 102 such that a data processing system on network 102 can communicate with a data processing system on network 138. Data processing system 140 is a data processing system in communication with network 138 and used by another carrier to execute other carrier's billing application 142. Carrier billing application 107 and other carrier's billing application 142 communicate with each other using back-channel communication 144 according to an embodiment.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments. Data processing system 200 is also representative of a device, such as device 134 in FIG. 1 in which computer usable program code or instructions may be located for operating an illustrative embodiment. Data processing system 200 in the form of device 134 is also representative of an embedded or removable computing device, such as a communication device or a location device, which can be associated with an automobile, and in which computer usable program code or instructions for operating a process of the illustrative embodiments may be located. Data processing system 200 is described as a computer only as an example, without being limited thereto. Implementations in the form of device 134 in FIG. 1 may modify data processing system 200 and even eliminate certain depicted components there from without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as zone services application 105, carrier billing application 107, and other carrier billing application 142 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
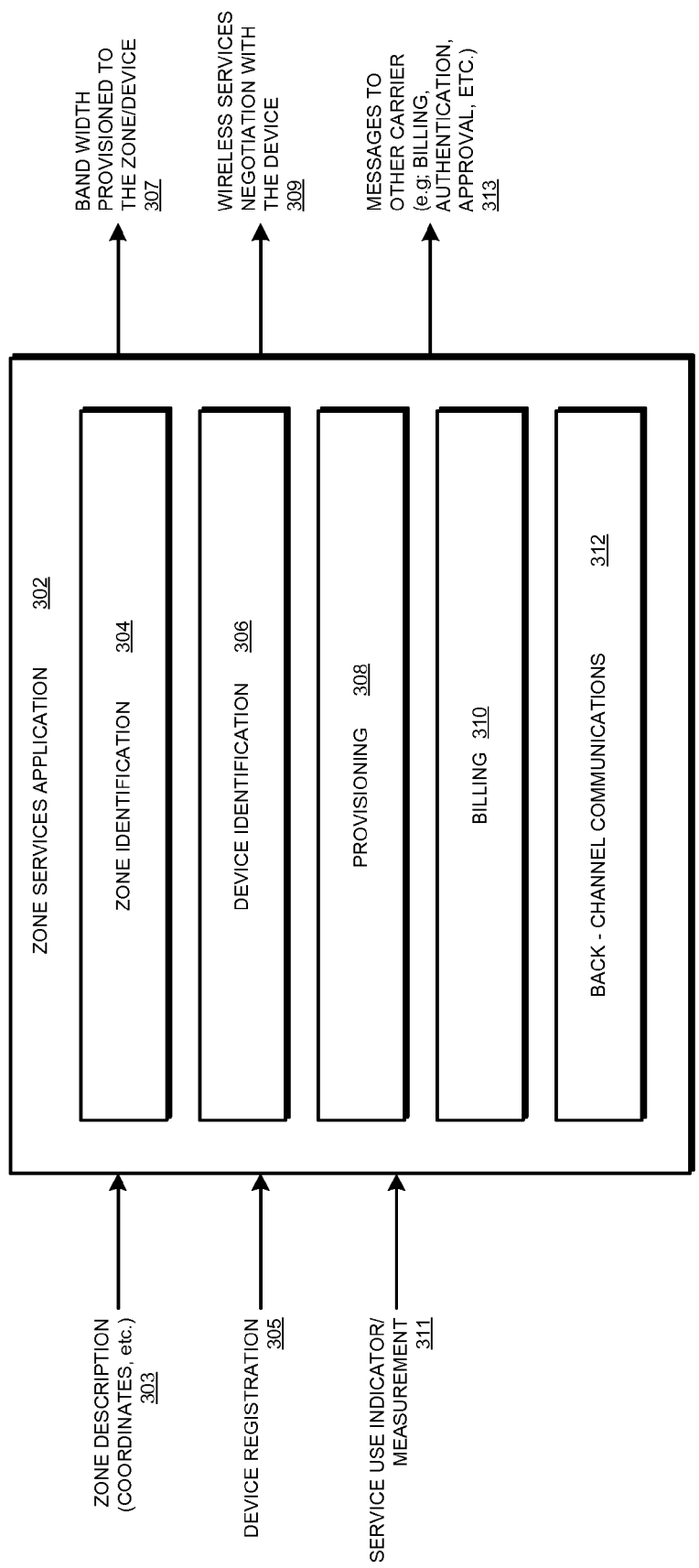
FIG. 3 depicts a block diagram of an example configuration of a zone services application in accordance with an illustrative embodiment.

With reference to FIG. 3, this figure depicts a block diagram of an example configuration of a zone services application in accordance with an illustrative embodiment. Zone services application 302 is an example of zone services application 105 in FIG. 1.

Component 304 identifies a geo-fenced zone within which a wireless service provider is to provide subsidized wireless service. In one embodiment, application 302 receives a set of zone coordinates 303 corresponding to the limits of a geo-fenced area or space, which describe and bound a geo-fenced zone. In one embodiment, zone coordinates 303 are GPS coordinates. In another embodiment, zone coordinates 303 are representations of fixed points in space using any other suitable form, where the fixed points in space define the limits of the geo-fenced zone. Component 304 uses zone coordinates 303 to identify a geo-fenced zone in a wireless service provider's data processing system.

Device identification component 306 identifies a device as the device becomes present in a geo-fenced zone identified by component 302. In one embodiment, component 304 further identifies whether the device is simply present in the geo-fenced zone, or is also requesting the use of the subsidized services therein. Application 302 receives or uses device registration messaging 305 that occurs between the device and the provider's infrastructure to identify the presence of the device, and any requests the device makes for using the subsidized services, while within the geo-fenced zone.

Provisioning component 308 provisions a wireless service infrastructure, such as a base station on tower 132 in FIG. 1, to deliver bandwidth 307. In one embodiment, provisioning for bandwidth 307 occurs when component 302 identifies a geo-fenced zone. In another embodiment, provision for bandwidth 307 is adjusted as and when devices enter and leave the geo-fenced zone. In another embodiment, provisioning for bandwidth 307 is adjusted periodically or upon certain events.

When device registration 305 identifies a mobile device in a geo-fenced zone, component 308 also negotiates (309) the wireless services available to the mobile device in the geo-fenced zone. For example, in one embodiment, a wireless service provider offers subsidized data services in the geo-fenced zone, and negotiation 309 informs the mobile device of the type, frequency, speeds, and other specifics of the data service available to the device on a subsidized-basis. In another embodiment, a wireless service provider offers voice, text messaging, and data services in the geo-fenced zone, and negotiation 309 informs the mobile device of the type, frequency, speeds, and other specifics of the various services available to the device on a subsidized-basis or other basis.

While a mobile device is using the subsidized services within a geo-fenced zone, application 302 receives service use indicator 311 as an input. In one embodiment, service use indicator 311 comprises a measurement of the amount of subsidized services used by the device within the geo-fenced zone. The measurement, the indication, or both, in input 311 can be used for billing, limiting amount or duration of consuming the subsidized services, tracking patron loyalty, targeted advertising, and any other purpose.

Billing component 310 uses input 311 to create a billing entry for the mobile device. When the subsidized services are free within the geo-fenced zone, the billing entry may be avoided altogether, or may be created to indicate a zero or nominal charge. When the subsidized services are offered at a reduced price, the billing entry may be created to indicate a charge according to the subsidized price.

In one embodiment, when the mobile device is a subscriber of the wireless service provider that is providing the subsidized services, billing component 310 creates the billing entry in the subscriber's account. When the mobile device is not a subscriber of the wireless service provider that is providing the subsidized services, billing component 310 creates the billing entry to communicate to another provider that is the device's subscribed provider, using back-channel communications between the provider and the other provider.

Back-channel communication component 312 facilitates the system-to-system communications between two wireless service providers, such as between applications 107 and 142 in FIG. 1. For example, component 312 facilitates messaging between the provider of the subsidized services and a different provider of subscribed services to a mobile device to communicate messages 313. Messages 313 include back-channel messages pertaining to billing of subsidized services used in a geo-fenced zone, authentication of a device identified in a geo-fenced zone, approval from another provider to allow a device to use subsidized services in the geo-fenced zone, and other suitable messages in a given implementation.

Figure 4:
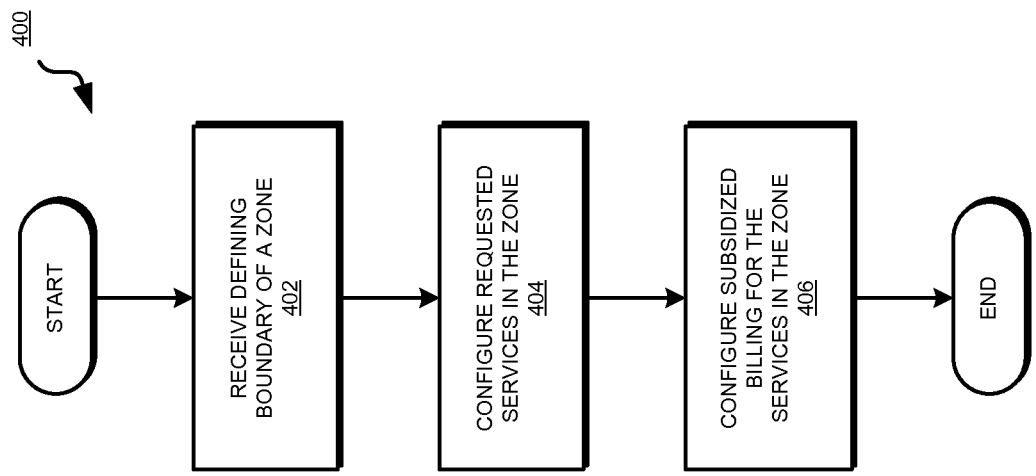
FIG. 4 depicts a flowchart of an example process of configuring subsidized wireless services in geo-fenced zones in accordance with an illustrative embodiment.

With reference to FIG. 4, this figure depicts a flowchart of an example process of configuring subsidized wireless services in geo-fenced zones in accordance with an illustrative embodiment. Process 400 can be implemented in zone services application 302 in FIG. 3.

The application receives defining boundary of a geo-fenced zone (block 402). For example, the application receives a set of coordinates and/or other measurements to accurately define the boundary of the geo-fenced zone with fixed points in space. In one embodiment, the application also receives or determines (not shown), the terms for subsidizing wireless services within the geo-fenced zone.

The application configures the requested wireless services in the geo-fenced zone (block 404). The application configures the services according to received or determined terms of providing the subsidized services. The terms can be specified by the wireless service provider, the entity operating the geo-fenced zone to offer the subsidized services to their patrons, or a combination thereof.

The application configures the subsidized billing for the services in the geo-fenced zone (block 406). The application ends process 400 thereafter. For example, the application may configure some billing for provisioning a wireless service provider as a provider of the services in the geo-fenced zone. The application may further configure some usage based billing to the entity operating the geo-fenced zone, an account associated with a device using the subsidized services, both, a third-party, or none.

Figure 5:
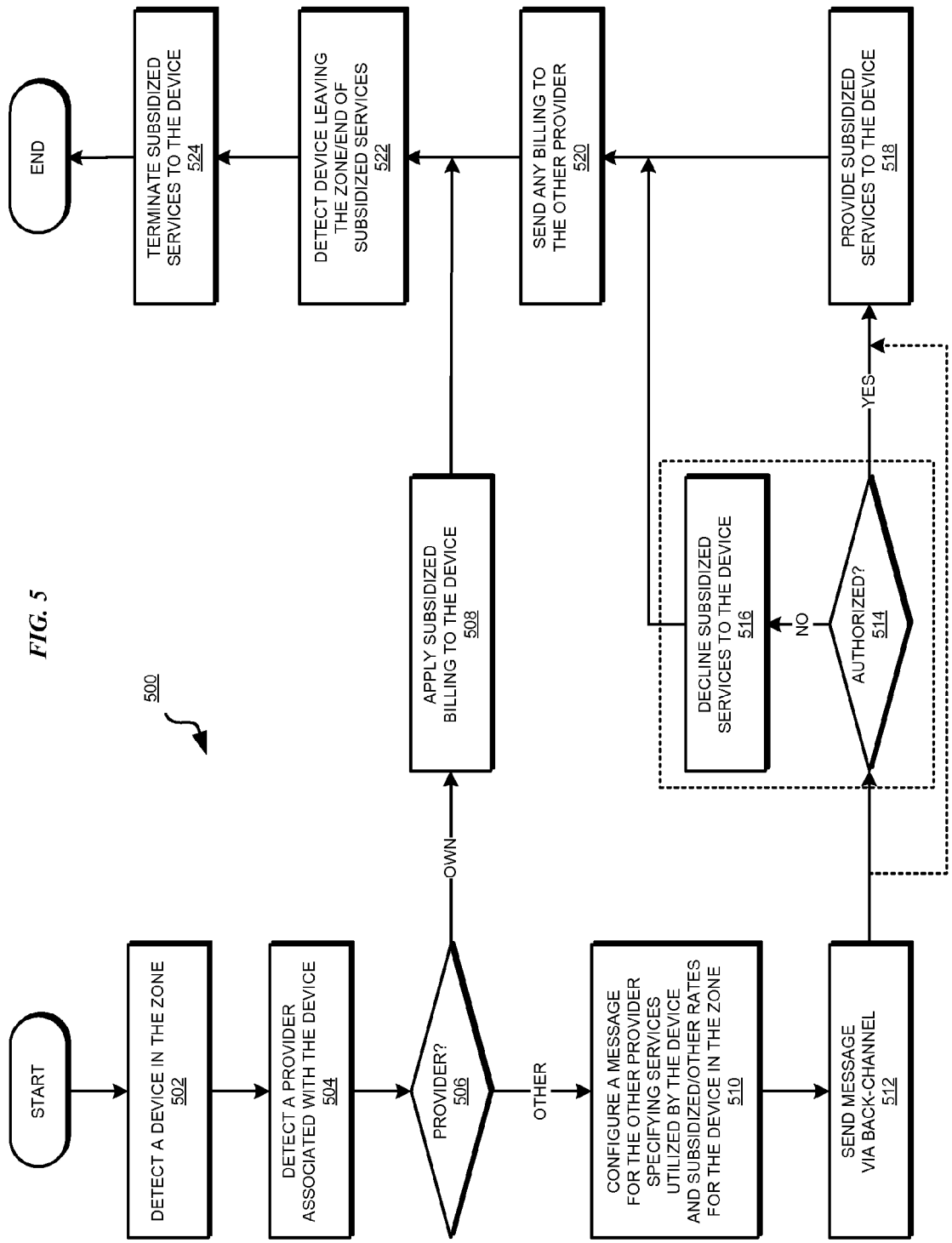
FIG. 5 depicts a flowchart of an example process of subsidizing wireless services in geo-fenced zones in accordance with an illustrative embodiment.

With reference to FIG. 5, this figure depicts a flowchart of an example process of subsidizing wireless services in geo-fenced zones in accordance with an illustrative embodiment. Process 500 can be implemented in zone services application 302 in FIG. 3.

The application detects a mobile device in the geo-fenced zone (block 502). The application detects a carrier or provider associated with the device (block 504). For example, the application detects whether the device is associated with a subscriber account at the provider of the subsidized services or another wireless service provider.

If the provider to which the device subscribed and the provider of the subsidized services is the same ("Own" path of block 506), the application applies subsidized billing for the usage of the subsidized services to the account associated with the device at the provider (block 508). The application then proceeds to block 522.

If the provider to which the device subscribed and the provider of the subsidized services are different ("Other" path of block 506), the application configures a message for the other provider (to which the device subscribes), specifying the services utilized by the device and the subsidized or other rates applicable to such usage while the device is in the geo-fenced zone (block 510). The application sends the message to the other provider via a back-channel provider-to-provider communication (block 512).

In one embodiment, blocks 514 and 516 are optional. In some cases where such an embodiment applies, the other provider may have to authorize the device's operation on the subsidized services provider's network (block 514). If the other provider denies the device's operation on the subsidized service provider's network ("No" path of block 514), the application declines subsidized services to the device (block 518).

If the other provider authorizes the device's operation, or if optional blocks 514 and 516 are not applicable ("Yes" path of block 514, or the path from block 512 to block 518), the application provides the subsidized services to the device (block 518). The application sends an billing and/or other usage data or measurements to the other provider (block 520).

The application detects the device leaving the geo-fenced zone or another indication to end the use of the subsidized services (block 522). For example, an entity operating the geo-fenced zone may set usage limits on the subsidized services, and when a device approaches or meets the usage limit, the application can detect or receive an indication of an impending or occurred end of the subsidized services to the device.

The application terminates the subsidized services to the device (block 524). The application ends process 500 thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method is provided in the illustrative embodiments for subsidizing wireless services in geo-fenced zones. The illustrative embodiments restrict the access to wireless services using boundaries defined by fixed points in space and regardless of a usable range of a transceiver through which the wireless services are provided.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable storage medium. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can store a program for use by or in connection with an instruction execution system, apparatus, or device. The term "computer readable storage device," or variations thereof, does not encompass a signal propagation media such as a copper cable, optical fiber or wireless transmission media.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for subsidizing a wireless service, the method comprising:
   configuring a geo-fenced zone, the geo-fenced zone comprising a boundary defined by a set of fixed points in space;
   configuring a subsidized pricing for the wireless service when the wireless service is consumed by a mobile device within the geo-fenced zone, forming a subsidized wireless service;
   detecting the mobile device in the geo-fenced zone;
   providing the mobile device the subsidized wireless service; and
   applying a billing entry to an account associated with the mobile device, wherein the billing entry charges the account a subsidized amount corresponding to a measured amount of subsidized wireless service used by the mobile device while the mobile device remains within the geo-fenced zone, wherein the subsidized amount is less than an agreed amount applied to the account when the mobile device consumes the measured amount of wireless service outside the geo-fenced zone.

2. The method of claim 1, further comprising:
   detecting that the mobile device has left the geo-fenced zone;
   terminating providing the wireless service at the subsidized pricing to the mobile device.

3. The method of claim 1, wherein the subsidized amount is zero.

4. The method of claim 1, further comprising:
   determining whether the mobile device is authorized to use the subsidized wireless service, wherein the providing is responsive to the mobile device being authorized.

5. The method of claim 4, wherein a first provider provides the subsidized wireless service, further comprising:
   recognizing that the account exists with a second provider; and
   receiving an authorization from the second provider.

6. The method of claim 1, wherein the wireless service comprises a wireless broadband data service.

7. The method of claim 1, wherein the wireless service remains available to the mobile device from the provider at a pricing different from the subsidized pricing outside the geo-fenced zone.

8. The method of claim 1, wherein a fixed point in space is defined by a coordinate system applicable to the space.

9. The method of claim 8, wherein the coordinate system comprises Global Positioning System (GPS) coordinates.

10. The method of claim 9, wherein the geo-fenced zone comprises a three-dimensional space.

11. The method of claim 8, wherein the coordinate system comprises coordinates computed using triangulation.

12. The method of claim 1, where the detecting comprises:
   receiving a request from the mobile device to use the subsidized wireless service while the mobile device is physically present within the geo-fenced zone.

* * * * *